June 26, 1956 J. HALLER 2,752,211
SELF-LUBRICATING MACHINE ELEMENT
Filed Dec. 24, 1952 2 Sheets-Sheet 2
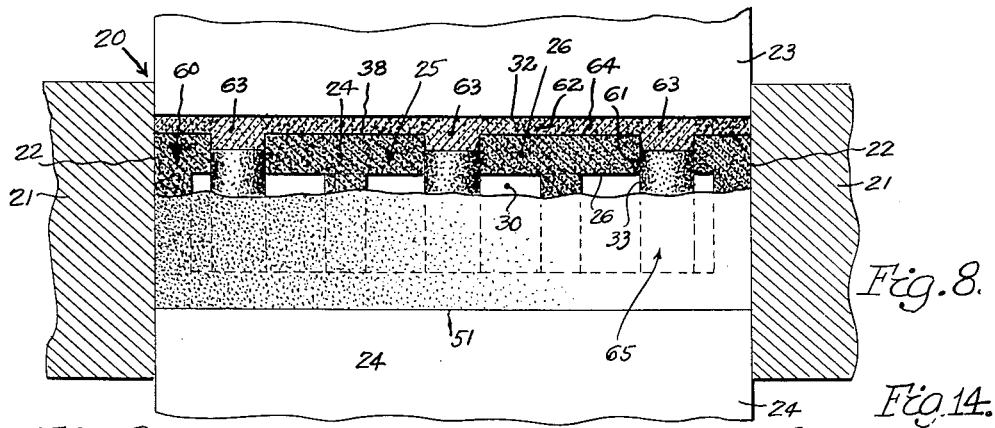
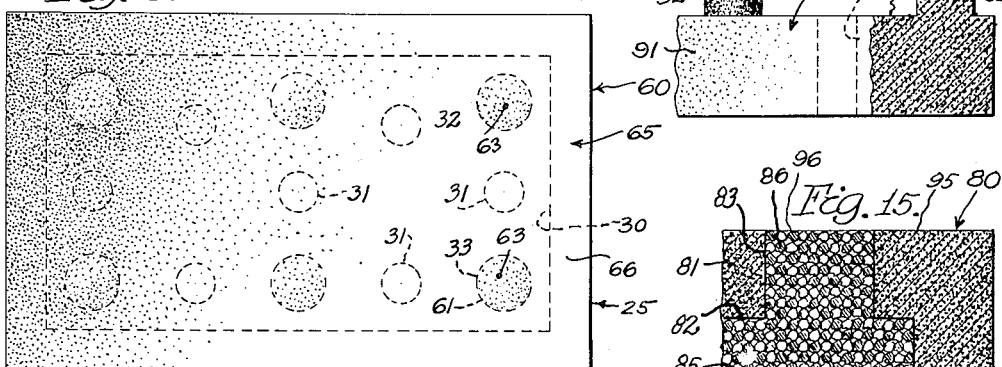
INVENTOR.
John Haller
BY Barthel + Bugbee
Attys United States Patent Office 2,752,211
Patented June 26, 1956

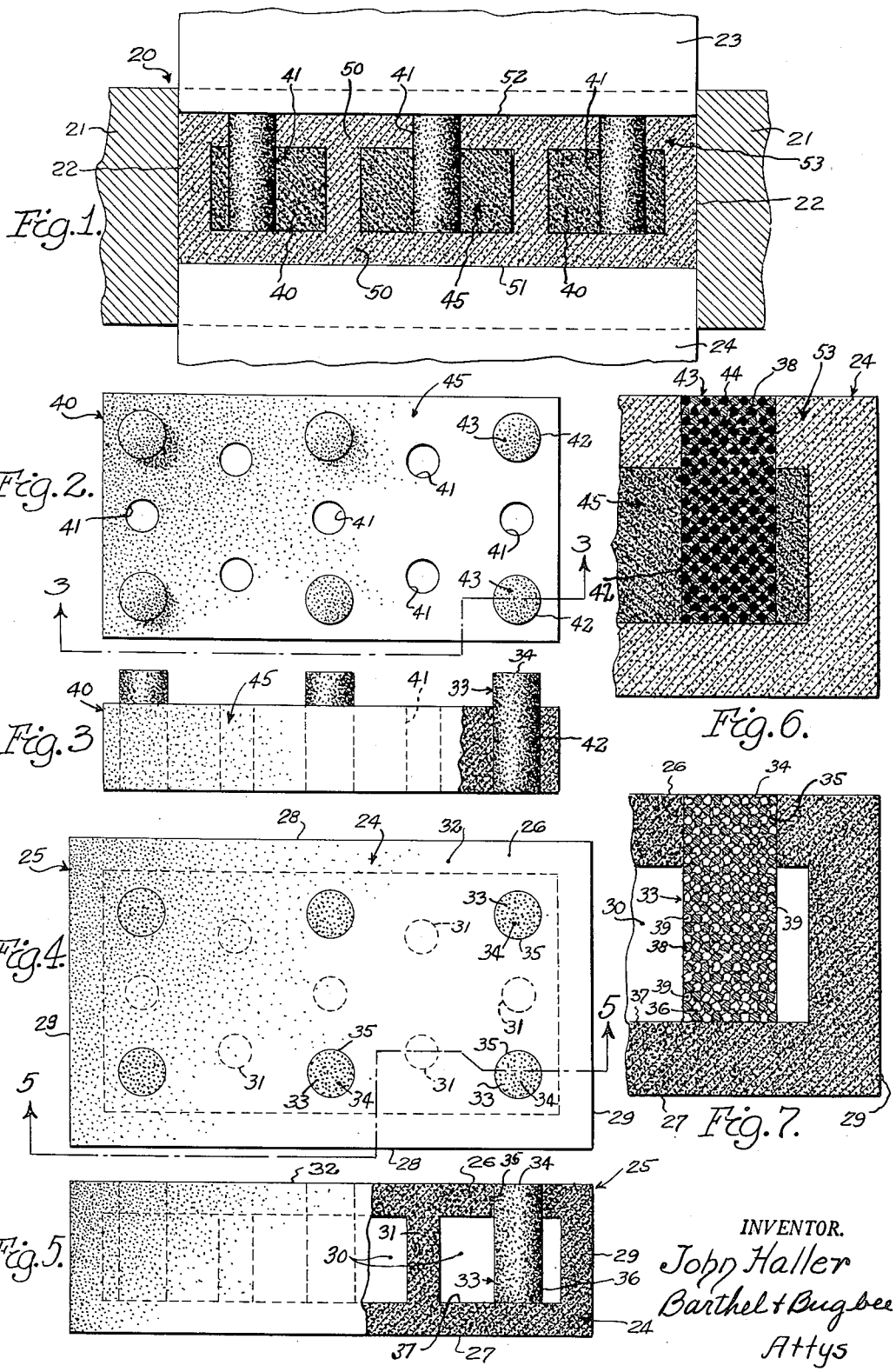

2,752,211
SELF-LUBRICATING MACHINE ELEMENT

John Haller, Northville, Mich., assignor, by mesne assignments, to Allied Products Corporation, Detroit, Mich., a corporation of Michigan Application December 24, 1952, Serial No. 327,764

3 Claims. (Cl. 308—240)

This invention relates to machine elements, such as wear members and, in particular, to lubricated wear members.

One object of this invention is to provide a self-lubricating machine element or wear member of sintered powdered metal wherein the wear-sustaining surface is relatively dense so as to give it the maximum resistance to wear over the major portion of its surface, means, however, being incorporated therewith to provide localized lubrication at spaced locations thereon.

Another object is to provide a self-lubricating machine element or wear member of the foregoing character having a lubricant reservoir in the interior thereof and lubricant feeding elements connecting the reservoir with the wear-sustaining surface so as to transmit lubricant therebetween.

Another object is to provide a self-lubricating machine element or wear member of the foregoing character and the process of making it, wherein the lubricant-transmitting elements are themselves formed of sintered powdered metal of a cellular or sponge construction to facilitate the flow of lubricant by capillary action.

Another object is to provide a modified self-lubricating machine element or wear member of the foregoing character and process of making it wherein an additional layer of a material of superior bearing qualities, such as bronze, is superimposed upon the wear member and provided with localized lubricating means.

Another object is to provide a modified self-lubricating machine element or wear member of the foregoing character and process of making it, wherein lubricant-distributing grooves are formed in the wear-sustaining surface for additionally facilitating the flow of lubricant from the lubricated spots thereof over the remainder of that surface.

Other objects and advantages of the invention will become apparent during the course of the following description of the accompanying drawings, wherein:

Figure 1 is a central vertical section through the die cavity of a powdered metal molding press, showing the parts of a self-lubricating machine element or wear member in position during the molding operation, according to one form of the invention;

Figure 2 is a top plan view of a meltable core of infiltratable metal or metal alloy used in forming the self-lubricating machine element or wear member of Figure 1;

Figure 3 is a side elevation, partly in vertical section, of the core shown in Figure 2, taken along the line 3—3 in Figure 2;

Figure 4 is a top plan view of the machine element or wear member of Figure 1 after sintering;

Figure 5 is a side elevation of the machine element or wear member of Figure 4, partly in vertical section and taken along the line 5—5 in Figure 4;

Figure 6 is an enlarged fragmentary view of the right-hand side of Figure 1, showing the relationship of the parts before sintering;

Figure 7 is a view similar to Figure 6, but showing the relationship of the parts after sintering;

Figure 8 is a central vertical section, partly in side elevation, through the die cavity of a powdered metal molding press showing the parts of a modified self-lubricating machine element or wear member in position during the molding operation;

Figure 9 is a top plan view of the machine element or wear member of Figure 8 after sintering;

Figure 10 is a side elevation partly in vertical section of the machine element or wear member shown in Figure 9;

Figure 11 is a central vertical section, partly in side elevation, through the die cavity of a powdered metal molding press showing the parts of a further modified self-lubricating machine element or wear member in position during the molding operation;

Figure 12 is a top plan view of the machine element or wear member of Figure 11 after sintering;

Figure 13 is a perspective view of the sintered machine element or wear member shown in Figure 12;

Figure 14 is a fragmentary side elevation similar to Figure 3 but showing a modified core for producing a cellular oil well integral with its lubricant-transmitting plugs; and Figure 15 is a view similar to Figure 7, but showing a cellular oil well wear member produced with the aid of the modified core shown in Figure 14.

Machine elements such as wear members hitherto constructed from sintered powdered metal have been conveniently made by powder metallurgy, but difficulty has arisen in lubricating them satisfactorily and at the same time making them sufficiently resistant to wear, these two conditions conflicting with one another. For the maximum resistance to wear, the wear-sustaining surface of the machine element or wear member should be as dense as possible, with the minimum porosity, so as to give the utmost hardness to that surface. For efficient lubrication, however, the surface should be sufficiently porous to enable the lubricant to be transmitted freely to the surface, and, generally speaking, the more porous the surface, the better the lubrication obtained for that surface, but the poorer the wear-resisting qualities, so that the one condition tends to defeat the other.

The present invention enables both conditions to be satisfied by providing a hard dense wear-resisting surface which is very strong and durable but which has too small a porosity to transmit lubricant combined with an internal lubricant chamber having porous lubricant-transmitting plugs leading to spaced spots in the wear-sustaining surface so as to give localized lubrication at spaced locations from which the lubricant will spread over the entire wear-sustaining surface. A modified self-lubricating wear member (Figures 8 to 10 inclusive) provides a layer of bearing material such as bronze of superior bearing qualities upon the wear-sustaining surface of the wear member, this bearing material being generally very dense but locally porous immediately above the lubricant-transmitting plugs so as to convey the lubricant from the plugs to the bearing surface. Another modified self-lubricating wear member (Figures 11 to 13 inclusive) provides a network of intercommunicating grooves in the wear-sustaining surface for facilitating the distribution of the lubricant from the localized lubricating spots to all parts of the wear-sustaining surface. These grooves are formed by a sintering process eliminating the necessity for machining them.

Referring to the drawings in detail, Figure 1 shows the central portion of a conventional powdered metal molding press, generally designated 20, having a mold or die 21 with a die cavity 22, the die 21 being supported on the press bed or die table (not shown) in the usual manner, Upper and lower plungers 23 and 24 are reciprocable into and out of the die cavity or bore 22 for compressing a charge of powdered metal therein.

The molding press 20 in Figure 1 is shown in the process of molding or pressing powdered metal for the production of a self-lubricating wear member, generally designated 25 (Figures 4 and 5) according to the present invention. The wear member 25 includes a hollow box-like structure or body, generally designated 24, having top and bottom walls 26 and 27 and side and end walls 28 and 29 enclosing an internal lubricant chamber 30 which is crossed at intervals by pillars or strengthening webs 31 interconnecting the upper and lower walls 26 and 27. The upper wall 26 has a wear-sustaining or bearing surface 32 which carries the load and which is to be lubricated as the load or movable member moves relatively to the wear member surface 32. The wear member 25 is preferably of sintered powdered metal which is impregnated or infiltrated with another metal substantially to the saturation point, so as to make it substantially solid with little porosity. The wear member 25 is so constructed, according to the process set forth below, to provide this very hard, dense and consequently strong upper wall 26 which is resistant to wear, with little or no porosity capable of freely transmitting lubricant by capillarity.

The lubricant is transmitted from the lubricant chamber 30 through the upper wall 26 to the wear-sustaining surface 32 by porous lubricant-transmitting elements or plugs 33 of cellular or honeycomb construction formed in a manner hereinafter described and having upper surfaces 34 substantially flush with the wear-sustaining surface 32 but highly porous, in contrast to the very dense and almost solid upper wall 26, the plugs 33 projecting through passageways 35 in the upper wall 26. At its lower end 36, each plug 33 rests upon the inner surface 37 of the lower wall 27 (Figure 7). The plugs 33 are formed from relatively coarse particles 38 of metal which are separated from one another by interstices or minute gaps 39 yet united to one another by the sintering process described below. The resulting lubricant-transmitting element or plug 33 is a cylinder of cellular or honeycomb construction somewhat resembling a sponge in appearance.

In the process of making the self-lubricating wear member 25, according to the invention, a core 40 is first prepared (Figures 2 and 3) from material which is infiltratable into the powdered metal of which the wear member 25 is to be constructed. If the wear member 25 is to be formed from powdered iron, for example, the core 40 may be made from brass, such as 85% copper and 15% zinc, this being readily infiltratable into powdered iron. The core 40 is either cast in solid form or pressed in powdered metal form, as desired, holes or bores 41 being provided at intervals for the formation of the pillars 31, and other holes 42 also being provided at intervals for the insertion of the lubricating element or plug blanks 43 from which the lubricating plugs or elements 33 are formed during sintering. The holes or bores 42 are so formed that the blanks 43 may be separately inserted therein during molding, as described below.

The blanks 43 are separately prepared from a mixture of the iron particles 38 which are preferably coarser than the iron particles of which the wear member body 24 as a whole is to be formed. The iron particles 38 are mixed or interspersed with brass particles 44 in the manner shown diagrammatically in Figure 6 or optionally the iron particles 38 are filled in with solid brass so as to form an integral casting. A preferred proportion for the iron and brass in the lubricating plug blank 43 is 50% iron and 50% brass.

When the core 40 and lubricating plug blanks 43 have been thus separately prepared, they are placed in an assembly, generally designated 45 (Figures 2 and 3) with the plugs or lubricating elements 43 inserted in the holes 42. The assembly 45 is then transferred to the die cavity 22 of a conventional powdered metal molding press 20 and placed upon a layer 50 of powdered metal which has first been poured into the die cavity 22 on top of the upper surface 51 of the lower plunger 24. The powdered metal, such as powdered iron, is then poured into the die cavity 22 to fill the holes 41 and extend entirely around the assembly 45 of the core 40 and lubricating plug blanks 43. The upper press plunger 23 is then lowered into the die cavity 22 and force applied thereto so that its upper surface 52 compresses the powdered metal 50 against the upper surface 51 of the lower plunger 24, compressing the entire unsintered unit, generally designated 53.

The unsintered and semi-finished assembly 53 is then transferred to a conventional sintering oven and subjected to a sintering temperature of suitable height, for example 2020° F. for a period of time varying according to the size of the assembly 53 to be sintered. For a very small wear member, sintering periods in the neighborhood of one-half hour have been found satisfactory. In any instance, the sintering temperature must be above the melting point of the material of the core 40 but below the melting point of the material of the body 24, and lubricant-transmitting elements or plugs 33. The sintering operation may be carried out in any suitable atmosphere, as is known to those skilled in the powder metallurgy art, such as hydrogen, for example.

During the sintering operation, the high heat employed in the sintering oven causes the core 40 to melt and likewise the brass particles 44 in the lubricant-transmitting plug blanks 43, the molten brass or other metal of which the core 40 and particles 44 are composed becoming liquid and flowing into the interstices between the iron particles of the powdered iron 50 of which the body 24 is composed. At the same time, the iron particles become fused to one another. The result is a sintered powdered iron structure densely impregnated with brass (Figures 4 and 5) leaving a hollow oil cavity or oil chamber 30 within the body 24, with pillars 31 of sintered powdered iron disposed at spaced intervals to strengthen the load-sustaining qualities of the upper wall 26 by thus supporting it upon the lower wall 27. At the same time, the brass particles 44 in melting within the lubricant plug blanks 43, flow similarly into the iron particle interstices in the body 24 (Figures 6 and 7), leaving the tiny spaces or capillary passages 39 between the coarse iron particles 38. In this manner, the oil chamber or lubricant well 30 is connected by a metallic cellular or honeycomb wick or plug 33 through which the lubricant will rise by capillary attraction to the wear sustaining surface 32.

While the foregoing operation has been described in connection with powdered iron, it will also be understood that powdered bronze may be used for the body 24 and metallic lead or lead antimony alloy for the core 40 and spacing particles 44 in the plug blanks 43. During sintering the same action occurs as previously described, in that the lead of the core 40 melts together with the lead particles 44 of the plug blanks 43, infiltrating into the bronze particles 50 and causing the latter to be greatly densified and strengthened. At the same time, the coarser bronze particles 44 in the lubricating elements or plugs 33 thereby form a honeycomb or cellular structure forming a metallic bronze wick through which the oil will flow upward by capillary attraction from the lubricating chamber 30 left in the wake of the melting core 40. The lubricant chamber 30 is of the same shape as the core used to form it.

The modified wear member, generally designated 60 (Figures 8 to 10 inclusive) is formed in a similar manner to the wear member 25 of Figures 1 to 7 inclusive and the same powdered iron and brass may be used for the body 24, coarse particles 38 of the lubricant plug blanks 43 and brass for the core 40 and lubricant plug particles 44. In order to provide a superior bearing surface, however, over that obtainable with sintered powdered iron, the wear member 25 is machined so that a socket 61 is provided above each lubricant plug 33, or such socket provided by a suitable removable non-infiltratable core during the procedure described in connection with Figures 1 to 7 inclusive. The wear member 25 thus equipped with the sockets 61 above the plugs 33 is then placed in the die cavity 22 of the molding press 20 as before and a layer 62 of bronze particles placed over the top surface 32 of the body 24. The upper platen 23 is then brought down into the die cavity, compressing the layer 62 of bronze particles against the upper surface 32 of the body 24, densifying the layer 62. In the portions 63 above the lubricant plugs 33 within the sockets 61, however, the bronze particles are compressed to a much less extent than in the layer portions 64 above the top wall 26, so that a much greater porosity occurs at the location 63.

The composite body, generally designated 65, is then removed from the die cavity 22, such as by reciprocating the plungers 23 and 24 upward, and again placed in a sintering oven and sintered at a suitable temperature corresponding to the powdered bronze layer 62, for example at 1440° to 1500° F. for a period of approximately 15 minutes for a small article. As a result, this second sintering operation causes the bronze particles of the layer 62 to unite with one another in a cellular structure, the porosity of which is much coarser in the portions 63 above the lubricant-transmitting plugs 33 than in the portions 64 above the top wall 26 of the body 24. The denser bronze portions 64 thus sustain the load and wear carried by the upper surface 66 thereof, whereas the more porous portions 63 transmit the lubricant thereto from the lubricant chamber 30 by way of the lubricant-transmitting plugs 33.

In filling with lubricant either the wear member 25 or the wear member 60, the lubricant chamber 30 may be drilled and threaded to provide a filling hole therein (not shown) which is closed by a threaded plug after filling with lubricant, or by heating the wear member 25 or 60 in a bath of hot oil to expel the air from the chamber 30 and fill it with oil. Alternatively, the forcing of the oil into the chamber 30 may be facilitated by performing the foregoing operation in an evacuated vacuum chamber, the air being withdrawn from the chamber 30 by the evacuation process and the oil forced into the chamber 30 by the pressure of air readmitted to the tank. However, the filling of the oil chamber 30 by the heating or evacuation method is a slow procedure, due to the fact that the body 24 is so dense that very little oil will pass through its walls, and must accordingly enter by way of the capillary passages 39 extending through the lubricant-transmitting elements or plugs 33. Accordingly, the direct filling method is simpler and faster.

In the operation of the invention, the wear member 25 or 60 is supported in any suitable way according to the particular conditions under which it is to be used. If, for example, it is to support a device such as an instrument or machine element which is to be moved to and fro upon the top surface 32 or 66 thereof, or permitted to expand therealong, the said device is so located and its operations commenced. Meanwhile, the oil within the oil chamber 30 climbs upward through the interstices 39 between the coarse particles 38 of the lubricant-transmitting elements or plugs 33 by reason of capillary action or force, and emerges at the top surface 34 thereof, whence it spreads out over the adjacent wear-sustaining surface 32 either by the motion of the device supported thereon or by natural flow of the oil. In either case, a film of oil becomes spread over the wear-sustaining surface 32, reducing friction and wear thereon, yet at the same time the upper layer 26 of the body 24 is of a dense, hard and strong formation which resists wear more than ordinary sintered powdered metal bodies of porous construction would do.

The operation of the wear member 60 of Figures 9 and 10 is similar to that of the wear member 25, except that the oil climbing upward through the lubricant-transmitting plugs 33 by capillary attraction emerges at the top surface 34 and enters the porous portion 63 of the bronze layer 62, continuing to rise until it reaches the upper surface 66 thereof, even though the intervening layer portions 64 are of much denser porosity. The oil thus transmitted to the upper surface 66 above the porous portions 64 spreads out over this surface either by natural flow or by the motion of the device supported thereon, resulting in suitable lubrication of the surface 66 and consequent reduction of friction and lengthening of life due to reduction in wear.

The modified wear member, generally designated 70, shown in Figure 13 is of the same or similar construction to the wear members 25 or 60 previously described. In order to facilitate the distribution of the oil over the upper surface or wear-sustaining surface 32 or 66, as the case may be, a network 71 of oil-carrying grooves 72 is provided therein. This network 71 interconnects the areas above the lubricant-transmitting elements or plugs 33 with other portions of the upper surface 32 or 66, without interference from the device or article supported thereon.

The network 71 of grooves 72 is preferably formed during the sintering operation, as shown in Figure 11. The die cavity 22 of a conventional powdered metal molding press is again filled in the manner described in connection with Figure 1, and a wire mesh member 73 of infiltratable metal or metal alloy such as brass placed on the upper surface 74 thereof. The spaces 75 between the cross wires 76 and longitudinal wires 77 are then filled with powdered metal particles, such as iron particles, and the upper plunger 23 of the press 20 moved downward into the die cavity 22 to compress the entire assembly, generally designated 78.

When compression has been sufficiently accomplished, the assembly 78 (Figure 12) is removed from the die cavity 22, placed in a sintering oven and sintered in the manner described in connection with Figures 1 to 7 inclusive. As before, a wear member 70 is formed similar in construction to the wear member 25 and similarly having a lubricant chamber 30, supporting pillars 31 and lubricant-transmitting elements or plugs 33. In addition, however, the wires 76 and 77 of the wire mesh member 73 melt during the sintering operation, being of material of lower melting point than the powdered iron of the body 24, and infiltrate into the interstices of the metal particles of the latter. The disappearance of the wire mesh member 73 results in the formation of a network 71 of grooves 72 (Figure 13) interconnecting the top surfaces 34 of the lubricant-transmitting elements or plugs 33. The network 71 of grooves 72 is of course of the same shape and distribution as the wire mesh member 73 from which it is formed and which disappeared by infiltration during the sintering operation.

The filling of the wear member 70 and its operation are generally the same as described in connection with the filling and operation of the wear members 25 and 60. In addition, however, as the oil reaches the top surfaces 34 of the cellular or honeycomb lubricant-transmitting plugs 33, it flows into the grooves 72 of the network 71 and by these is transmitted to all parts of the wear-sustaining surface 79. Since the bottoms and sides of the grooves 72 lie below the surface 79, they are unimpeded by any object resting upon the surface 79, such as an instrument or machine element, hence the oil flows more freely than where such grooves 72 are not provided.

The modified self-lubricating wear member, generally designated 80, a portion of which is shown in Figure 15, is provided with a body 81 of sintered powdered metal, such as powdered iron, similar in composition and characteristics to the body 24 of the wear member 25 of Figures 1 to 7 inclusive. Instead of the hollow or empty oil well or lubricant chamber 30, and cellular or honeycomb lubricant-transmitting elements or plugs 33, however, the body 81 is provided with a lubricant chamber 82 and passageways 83 leading therefrom to the outside thereof, the whole being filled with a cellular or honeycomb structure, generally designated 84. The latter consists of a honeycomb oil well or lubricant chamber portion 85 filling the chamber 82 and cellular or honeycomb lubricant-transmitting portions 86 integral therewith and forming a part thereof. This construction, although holding a smaller amount of lubricant than the hollow or empty lubricant chamber 30 of Figure 7, nevertheless has the advantage of inhibiting the formation of air bells or bubbles, reducing the adverse effect upon lubricant flow which such air bubbles produce, and providing a more even flow of lubricant by reason of the capillary action resulting from the cellular or honeycomb construction. In other words, the entire lubricant containing and transmitting structure 84 is of the same construction as the lubricant-transmitting elements or plugs 33 of Figures 1 to 7 inclusive.

To produce the modified self-lubricating wear member 80 of Figure 15, a core, generally designated 90, is prepared from the same coarse iron particles and brass mixture as the lubricant-transmitting element blanks 43 (Figure 6), such as, for example, 50% iron and 50% brass. The core 90 consists of a main core casting 91 with integral extensions or projections 92 standing up from the upper surface 93 of the casting 91. The casting 91 is provided with holes 94 similar in purpose, construction and distribution to the holes 21 of Figures 2 and 3, and adapted to similarly result in reinforcing pillars (not shown) identical with the reinforcing pillars 31 of Figure 5.

Production of the modified wear member 80 of Figure 15 follows a similar procedure to that described in connection with Figures 1 to 7 inclusive, differing to the extent that the core 90 is placed upon the powdered iron layer 50 in the mold cavity 22 and additional powdered iron placed around it and above it, as well as extending downwardly through and filling the holes 94, as shown in Figure 1. The separate lubricant-transmitting element blanks 43 are of course not used because, as stated immediately above, these are already formed integrally with the casting 91. Compression of the charge 50 of powdered iron follows in the same manner hitherto described in connection with Figure 1, after which sintering in the sintering oven for a similar time and temperature occurs.

During the sintering operation, at a temperature above the melting point of brass but below the melting point of the iron particles of which the integral core is composed, the brass melts and infiltrates into the pores of the iron particles of the charge 50 as these become united by the sintering operation. Due to the large mass of brass contained in the core 90, the body 81 becomes densely impregnated with brass, leaving the cellular honeycomb structure 84 together with its cellular extensions or lubricant-transmitting portions 86 extending upward through the passageways 83 to the wear surface or bearing surface 95, supporting pillars of brass-impregnated sintered powdered iron being of course formed in the locations previously occupied by the holes 94 in the core 90. The filling of the modified wear member 80 with lubricant and its operation are generally the same as described in connection with the filling and operation of the wear members 25 and 60 described above. The lubricant, such as oil, permeates the entire cellular structure 84 and rises by capillary action through the lubricant-transmitting extensions 86 to the top surface 96 thereof. From the top surface 96 the oil or other lubricant spreads out laterally and lubricates the wear surface 95 as described above. The cellular or honeycomb construction of the lubricant chamber 82, however, inhibits the formation of air bubbles as stated above, increases the strength of the wear member 80 against crushing loads and gives a more efficient flow of lubricant.

What I claim is:

1. A self-lubricating wear-resisting machine element comprising a hollow sintered powdered metal body having a lubricant chamber therein and a load-sustaining wall with a wear surface thereon to be lubricated, a porous sintered powdered metal lubricant-transmitting structure extending from said chamber into proximity to said wear surface, said lubricant-transmitting structure having a coarser porosity than said load-sustaining wall, and a layer of bearing metal disposed upon said load-sustaining wall, said bearing metal being dissimilar to the metal of said body.

2. A self-lubricating wear-resisting machine element comprising a hollow sintered powdered metal body having a lubricant chamber therein and a load-sustaining wall with a wear surface thereon to be lubricated, a porous sintered powdered metal lubricant-transmitting structure extending from said chamber into proximity to said wear surface, said lubricant-transmitting structure having a coarser porosity than said load-sustaining wall, and a layer of bearing metal disposed upon said load-sustaining wall, said bearing metal being dissimilar to the metal of said body, said structure terminating at a level below the level of said wear surface to provide a recess therebetween, said bearing metal extending into said recess.

3. A self-lubricating wear-resisting machine element comprising a hollow sintered powdered metal body having a lubricant chamber therein and a load-sustaining wall with a wear surface thereon to be lubricated, a porous sintered powdered metal lubricant-transmitting structure extending from said chamber into proximity to said wear surface, said lubricant-transmitting structure having a coarser porosity than said load-sustaining wall, and a layer of bearing metal disposed upon said load-sustaining wall, said bearing metal being dissimilar to the metal of said body, said structure terminating at a level below the level of said wear surface to provide a recess therebetween, said bearing metal extending into said recess, said bearing metal within said recess having a coarser porosity than the bearing metal of said layer disposed externally of said recess.

References Cited in the file of this patent

UNITED STATES PATENTS

| | | |
|---|---|---|
| 763,409 | Lind | June 28, 1904 |
| 2,422,439 | Schwarzkopf | June 17, 1947 |
| 2,480,076 | Marinis | Aug. 23, 1949 |
| 2,625,452 | Haller | Jan. 13, 1953 |
| 2,628,138 | Blood | Feb. 10, 1953 |
| 2,665,960 | Causley | Jan. 12, 1954 |
| 2,698,774 | Haller | Jan. 4, 1955 |